United States Patent
Peng et al.

(10) Patent No.: US 11,110,433 B2
(45) Date of Patent: Sep. 7, 2021

(54) METAL-DOPED TIN OXIDE FOR ELECTROCATALYSIS APPLICATIONS

(71) Applicant: BASF SE, Ludwigshafen am Rhein (DE)

(72) Inventors: Xu Yuan Peng, Shanghai (CN); Rosalba Adriana Ricon-Ovalles, Mannheim (DE); Shyam Sundar Venkataraman, Florham Park, NJ (US); Domnik Bayer, Ludwigshafen am Rhein (DE); Andreas Haas, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/084,263

(22) PCT Filed: Mar. 17, 2017

(86) PCT No.: PCT/EP2017/056352
§ 371 (c)(1),
(2) Date: Sep. 12, 2018

(87) PCT Pub. No.: WO2017/158145
PCT Pub. Date: Sep. 21, 2017

(65) Prior Publication Data
US 2019/0060874 A1  Feb. 28, 2019

(30) Foreign Application Priority Data

Mar. 18, 2016 (EP) .................................... 16161261

(51) Int. Cl.
*B01J 23/14* (2006.01)
*B01J 23/18* (2006.01)
(Continued)

(52) U.S. Cl.
CPC ............... *B01J 23/14* (2013.01); *B01J 23/18* (2013.01); *B01J 35/0033* (2013.01);
(Continued)

(58) Field of Classification Search
CPC .. B01J 23/14; B01J 23/18626; B01J 35/1014; B01J 35/1019; B01J 37/036; B01J 37/08
See application file for complete search history.

(56) References Cited

U.S. PATENT DOCUMENTS 4,294,868 A * 10/1981 Kalbskopf ............ C03C 17/245
427/109
9,273,073 B2 * 3/2016 Sharma .................... C08K 9/04
(Continued)

FOREIGN PATENT DOCUMENTS

| CN | 1398791 A | 2/2003 |
| CN | 1876289 A | 12/2006 |

(Continued)

OTHER PUBLICATIONS

Terrier (Sb-doped SnO2 Transparent Conducting Oxide from the Sol-Gel Dip-coating Technique, Thin Solid Films 1995, vol. 263, pp. 37-41).*

(Continued)

*Primary Examiner* — Jun Li
(74) *Attorney, Agent, or Firm* — Faegre Drinker Biddle & Reath LLP

(57) ABSTRACT

The present invention relates to a metal-doped tin oxide which has a BET surface area of at least 30 m 2/g, and comprises at least one metal dopant which is Sb, Nb, Ta, Bi, W, or In, or any mixture thereof, wherein the metal dopant is present in an amount of from 2.5 at % to 25 at %, based on the total amount of tin and metal dopant atoms, and is in a mixed valence state containing atoms of oxidation state OS1 and atoms of oxidation state OS2, wherein the oxida- (Continued)

tion state OS1 is >0 and the oxidation state OS2 is >OS1 and the atomic ratio of the atoms of OS2 to the atoms of OS1 is from 1.5 to 12.0.

18 Claims, 1 Drawing Sheet

(51) Int. Cl.

| | | |
|---|---|---|
| B01J 35/10 | (2006.01) | |
| B01J 37/03 | (2006.01) | |
| B01J 37/08 | (2006.01) | |
| H01M 4/90 | (2006.01) | |
| H01M 4/88 | (2006.01) | |
| H01M 4/92 | (2006.01) | |
| C25B 1/04 | (2021.01) | |
| C25B 9/73 | (2021.01) | |
| C25B 11/093 | (2021.01) | |
| B01J 35/00 | (2006.01) | |
| H01M 8/1018 | (2016.01) | |

(52) U.S. Cl.
CPC ....... *B01J 35/1014* (2013.01); *B01J 35/1019* (2013.01); *B01J 37/031* (2013.01); *B01J 37/08* (2013.01); *C25B 1/04* (2013.01); *C25B 9/73* (2021.01); *C25B 11/093* (2021.01); *H01M 4/8803* (2013.01); *H01M 4/9075* (2013.01); *H01M 4/9083* (2013.01); *H01M 4/925* (2013.01); *H01M 8/1018* (2013.01); *H01M 2008/1095* (2013.01); *Y02E 60/36* (2013.01)

(56) References Cited

U.S. PATENT DOCUMENTS

| | | | |
|---|---|---|---|
| 9,873,107 B2 | 1/2018 | Hass et al. | |
| 2012/0316061 A1* | 12/2012 | Nagami | H01M 4/8803 502/339 |
| 2014/0135206 A1* | 5/2014 | Sharma | C08K 9/04 502/171 |
| 2015/0090943 A1 | 4/2015 | Shiraishi et al. | |
| 2018/0006313 A1 | 1/2018 | Haas | |

FOREIGN PATENT DOCUMENTS

| | | |
|---|---|---|
| CN | 1994965 A | 7/2007 |
| CN | 101413099 A | 4/2009 |
| CN | 101428848 A | 5/2009 |
| CN | 102234814 A | 11/2011 |
| CN | 102491408 A | 6/2012 |
| CN | 104099636 A | 10/2014 |
| WO | WO-2015158703 A1 | 10/2015 |
| WO | WO-2015158711 | 10/2015 |
| WO | WO-2016091957 A1 | 6/2016 |
| WO | WO-2017093386 A1 | 6/2017 |
| WO | WO-2017153292 A1 | 9/2017 |

OTHER PUBLICATIONS

Krishnakumar et al., Structural, optical and electrical characterization of antimony-subsituted tin oxide nanoparticles, Journal of Physics and Chemistry of Solids, vol. 70 (2009), pp. 993-999.*
Gurrola, M.P., et al., "Evaluation of the corrosion of Sb-doped $SnO_2$ supports for electrolysis systems", International Journal of Hydrogen Energy, vol. 39, No. 29, (2014), pp. 16763-16770.
International Preliminary Report on Patentability for PCT/EP2017/056352 dated May 15, 2017.
International Search Report for PCT/EP2017/056352 dated May 15, 2017.
Puthiyapura, V.K., et al., "Physical and electrochemical evaluation of ATO supported $IrO_2$ catalyst for proton exchange membrane water electrolyser", Journal of Power Sources, vol. 269, (2014), pp. 451-460.
Terrier, C., et al., "Sb-doped $SnO_2$ transparent conducting oxide from the sol-gel dip-coating technique", Thin Solid Films, vol. 263, No. 1, (1995), pp. 37-41.
Written Opinion of the International Searching Authority for PCT/EP2017/056352 dated May 15, 2017.
Xu, J., et al., "Antimony doped tin oxides and their composites with tin pyrophosphates as catalyst supports for oxygen evolution reaction in proton exchange membrane water electrolysis", International Journal of Hydrogen Energy, vol. 37, No. 24, (2012), pp. 18629-18640.
U.S. Appl. No. 16/061,882.

* cited by examiner

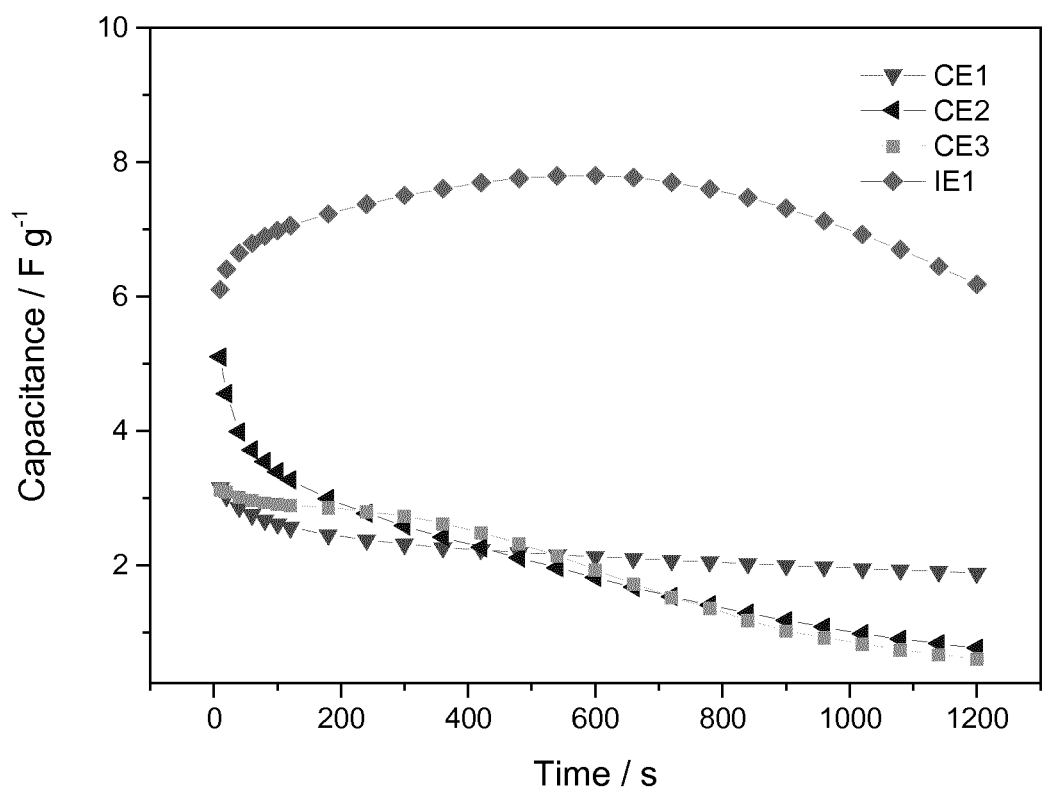

METAL-DOPED TIN OXIDE FOR ELECTROCATALYSIS APPLICATIONS

CROSS-REFERENCE TO RELATED APPLICATIONS

This application is a national stage application (under 35 U.S.C. § 371) of PCT/EP2017/056352, filed Mar. 17, 2017, which claims benefit of European Application No. 16161261.9, filed Mar. 18, 2016, both of which are incorporated herein by reference in their entirety.

Hydrogen is a promising clean energy carrier that can be produced by various technologies. At present, hydrogen is mainly produced by steam reforming of natural gas. However, steam reforming of fossil fuels produces low purity hydrogen.

High-quality hydrogen can be produced by water electrolysis. As known to the skilled person, a water electrolyser (i.e. a device in which the water electrolysis is carried out) contains at least one anode-containing half cell where the oxygen evolution reaction (OER) takes place, and at least one cathode-containing half cell where the hydrogen evolution reaction (HER) takes place. If two or more cells are linked together, a stacked configuration is obtained. Accordingly, a water electrolyser having a stacked configuration contains at least two anode-containing half cells and/or at least two cathode-containing half cells.

Different types of water electrolysers are known.

In an alkaline water electrolyser, the electrodes are immersed in a liquid alkaline electrolyte (e.g. an aqueous 20-30% KOH solution). The two electrodes are separated by a diaphragm, which keeps the product gases apart from each other but is permeable to the hydroxide ions and water molecules. The following reaction scheme shows the oxygen evolution reaction which takes place at the surface of the anode in the anode-containing half cell of the alkaline water electrolyser:

$$4OH^- \rightarrow O_2 + 2H_2O + 4e^-$$

In a polymer electrolyte membrane (PEM) water electrolyser (also referred to as a "proton exchange membrane" (PEM) water electrolyser), a solid polymer electrolyte is used which is responsible for proton transport from the anode to the cathode while electrically insulating the electrodes from each other, and for separating the product gases. The following reaction scheme shows the oxygen evolution reaction which takes place at the surface of the anode in the anode-containing half cell of the PEM water electrolyser:

$$2H_2O \rightarrow 4H^+ + O_2 + 4e^-$$

Due to its complexity, the oxygen evolution reaction has slow kinetics, which is why a significant overpotential is needed at the anode side for producing oxygen at reasonable rates. Typically, PEM water electrolysers are operated at a voltage of about 1.5 to 2 V (vs. RHE ("reversible hydrogen electrode")).

As the pH is very acidic (PEM: pH of less than 2) and a high overpotential has to be applied, the materials which are present in the anode side of a PEM water electrolyser need to be very corrosion resistant.

Typically, the anode of a water electrolyser comprises a catalyst for the oxygen evolution reaction (an OER electrocatalyst). Appropriate OER electrocatalysts are known to the skilled person and have been described e.g. by M. Carmo et al., "*A comprehensive review on PEM water electrolysis*", International Journal of Hydrogen Energy, Vol. 38, 2013, pp. 4901-4934; and H. Dau et al., "*The Mechanism of Water Oxidation. From Electrolysis via Homogeneous to Biological Catalysis*", ChemCatChem, 2010, 2, pp. 724-761.

Bulk catalysts have a limited surface area for electrochemical activity. For increasing the catalytically active surface area, it is generally known to apply a catalyst on a support.

Carbon materials such as carbon black, activated carbon, and graphene are commonly used as a support for different types of catalysts. However, under the operating conditions of the anode side of a PEM water electrolyser (i.e. highly acidic conditions and high overpotential), carbon is subjected to oxidative degradation (also referred to as "carbon corrosion") and is therefore not sufficiently stable for being used in the OER half cell.

In a PEM fuel cell, the oxygen evolution reaction is reversed and can be illustrated by the following reaction scheme:

$$4H^+ + O_2 + 4e^- \rightarrow 2H_2O$$

This reaction is commonly referred to as the "oxygen reduction reaction" (ORR) and takes place at the cathode of a PEM fuel cell. Appropriate ORR electrocatalysts are commonly known to the skilled person. Typically, in acidic media, electrocatalysts for ORR are different from those which are efficiently catalyzing OER.

At present, PEM fuel cell cathodes are typically operating at temperatures in the range of 60° C.-85° C. and potentials in the range of 0.5-0.95 V (vs. RHE). As the kinetics of carbon oxidation under PEM fuel cell operational conditions is relatively slow, carbon materials can be used as a support for ORR electrocatalysts. However, corrosion of carbon supports in PEM fuel cells is still a problem which is adversely affecting performance of PEM fuel cells.

Accordingly, there is still a need for materials which are sufficiently stable under the operating conditions of the cathode side of a PEM fuel cell, and, even more challenging, the anode side of a PEM water electrolyser; and which may act as an efficient support for OER or ORR catalyst.

It is known that metal-doped tin oxides, such as antimony-doped tin oxides (also referred to as "ATOs"), might be promising support materials for OER or ORR catalysts.

M. P. Gurrola et al., Int. J. Hydrogen Energy, 2014; 39; pp. 16763-16770, describe Sb-doped $SnO_2$ which has been tested as an electrocatalyst support for PEM electrolysers and fuel cells.

J. Xu et al., Int. J. Hydrogen Energy, 2012, 37, pp. 18629-18640; G. Liu et al., Int. J. Hydrogen Energy, 2014, 39, 1914-1923; and V. K. Puthiyapura et al., J. Power Sources, 2015, 269, pp. 451-460, are also describing Sb-doped tin oxides as electrocatalyst supports in PEM water electrolysers.

C. Terrier et al., Thin Solid Films, 263 (1995), pp. 37 to 41 describe the preparation of Sb-doped tin oxide films by a sol-gel dip-coating technique. The antimony is in a mixed valence state containing $Sb^{5+}$ ions and $Sb^{3+}$ ions. The incorporation of $Sb^{5+}$ ions into the $SnO_2$ lattice creates an electron donor center, while the incorporation of $Sb^{3+}$ creates an electron acceptor center. The coexistence of both sites may affect conductivity.

It is an object of the present invention to provide a metal doped tin oxide which is sufficiently stable under the operating conditions of a PEM water electrolyser or a PEM fuel cell and keeps electrochemical performance on a high level, and which may act as an efficient support for OER or ORR catalysts.

The object has been solved by a metal-doped tin oxide which has a BET surface area of at least 30 m²/g, and
comprises at least one metal dopant which is Sb, Nb, Ta, Bi, W, or In, or any mixture thereof,
wherein the metal dopant
(i) is present in an amount of from 2.5 at % to 25 at %, based on the total amount of tin and metal dopant atoms, and
(ii) is in a mixed valence state containing atoms of oxidation state OS1 and atoms of oxidation state OS2, wherein the oxidation state OS1 is >0 and the oxidation state OS2 is >OS1 and the atomic ratio of the atoms of OS2 to the atoms of OS1 is from 1.5 to 12.0.

In the present invention, it has been realized that a metal-doped tin oxide (metal-doped $SnO_2$) which complies with the above requirements shows a beneficial electrochemical performance (as indicated e.g. by capacitance tests) and keeps the electrochemical performance on a high level even under very corrosive conditions as typically used in PEM water electrolysers. Due to its high surface area, the metal-doped tin oxide represents an efficient support for electrocatalysts, in particular OER or ORR catalysts.

The metal dopant is in a mixed valence state. As known to the skilled person, the term "mixed valence state" means that the atoms of an element are present in at least two different oxidation states. Accordingly, the metal dopant contains atoms of a higher oxidation state OS2 and atoms of a lower oxidation state OS1. If the atomic ratio of the atoms of higher oxidation state (i.e. atoms of OS2) to the atoms of lower oxidation state (i.e. atoms of OS1) is at least 1.5 but not more than 12.0 (i.e. 1.5≤atoms(OS2)/atoms(OS1)≤12.0), this contributes to an improved balance between electrochemical performance (e.g. high capacitance values and capacitance retention during electrochemical testing), sufficiently high conductivity, and stability under the very corrosive conditions at the anode side of a PEM water electrolyser. The atomic ratio of atoms(OS2) to atoms(OS1) is determined by X-ray photoelectron spectroscopy.

If the metal dopant is e.g. Sb, the atoms of oxidation state OS2 are $Sb^{5+}$, and the atoms of oxidation state OS1 are $Sb^{3+}$. The incorporation of $Sb^{5+}$ ions into the $SnO_2$ lattice creates an electron donor center, while the incorporation of $Sb^{3+}$ creates an electron acceptor center.

Preferably, the atomic ratio of the atoms of OS2 (such as $Sb^{5+}$) to the atoms of OS1 (such as $Sb^{3+}$) is from 3.0 and 9.0, more preferably from 4.0 to 8.0, even more preferably from 5.0 and 7.0.

The metal-doped tin oxide may contain just one of the above-mentioned dopants, or may contain two or more of these dopants.

Preferably, the metal dopant is Sb. Optionally, Sb can be used in combination with one or more of the metal dopants Nb, Ta, Bi, W, and In. Alternatively, Sb can be the only metal dopant which is present in the tin oxide.

As indicated above, the metal dopant is present in an amount of from 2.5 at % to 25 at %, based on the total amount of tin and metal atoms. Preferably, the amount of the metal dopant is from 2.5 at % to 10.0 at %, more preferably 5.0 at % to 7.5 at %, based on the total amount of tin and metal dopant atoms.

As indicated above, the BET surface area of the metal-doped $SnO_2$ is at least 30 m²/g. More preferably, the BET surface area is at least 35 m²/g, even more preferably at least 40 m²/g, such as from 30 m²/g to 150 m²/g, more preferably from 35 m²/g to 110 m²/g, even more preferably from 40 m²/g to 98 m²/g.

Preferably, the metal-doped tin oxide has an electrical conductivity of at least 0.020 S/cm, more preferably at least 0.030 S/cm. Due to its electrical conductivity, the metal-doped tin oxide represents an efficient support for electrocatalysts, in particular OER or ORR catalysts.

In a particularly preferred embodiment,
the metal dopant is Sb, the atoms of oxidation state OS2 are $Sb^{5+}$, the atoms of oxidation state OS1 are $Sb^{3+}$, and the atomic ratio of $Sb^{5+}$ to $Sb^{3+}$ is from 4.0 to 8.0, even more preferably from 5.0 and 7.0,
the amount of Sb is from 2.5 at % to 10.0 at %, more preferably 5.0 at % to 7.5 at %, based on the total amount of tin and Sb atoms,
the BET surface area of the metal-doped tin oxide is from 35 m²/g to 110 m²/g, even more preferably from 40 m²/g to 98 m²/g.

Furthermore, the present invention relates to a process for preparing a metal-doped tin oxide as described above, wherein
a metal-doped precursor solid is prepared by a wet chemical synthesis from a reaction mixture comprising a tin-containing molecular precursor compound and a metal-dopant-containing molecular precursor compound,
the metal-doped precursor solid is subjected to a thermal treatment.

Wet chemical synthesis methods for preparing inorganic solids, in particular fine-dispersed inorganic powders in aqueous and non-aqueous solvents, are known to the skilled person.

A wet chemical synthesis method that can be used in the present invention is e.g. a sol-gel process, a chemical precipitation process, a hydrothermal synthesis process, a spray drying process, or any combination thereof.

Preferably, the reaction mixture comprising the tin-containing molecular precursor compound and the metal-dopant-containing molecular precursor compound is subjected to a chemical precipitation process or a sol-gel process.

For these wet chemical synthesis methods, appropriate reaction conditions such as pH and reaction temperature are known to the skilled person.

Just as an example, the tin-containing molecular precursor compound and the metal-dopant-containing molecular precursor compound can be mixed at acidic pH (exemplary acids: mineral acids such as HCl, carboxylic acids such as acetic acid), and the pH is subsequently raised by adding a base (e.g. an aqueous base such as aqueous ammonia) until the metal-doped precursor solid precipitates. The precipitated solid can be removed from the reaction mixture (e.g. by filtration) and subjected to a thermal treatment.

Appropriate solvents for carrying out a wet chemical synthesis are commonly known. In principle, a non-aqueous or an aqueous solvent can be used. Exemplary non-aqeuous solvents include alcohols, such as methanol, ethanol, propanol or butanol.

Typically, the tin-containing molecular precursor compound is a tin(IV) compound. However, it is also possible to use a tin(II) compound or a mixture of a tin(IV) compound and a tin (II) compound. The tin-containing molecular precursor compound can be a tin salt such as a tin halide (e.g. $SnCl_4$) or a tin nitrate, or a tin alkoxide or a mixture thereof.

The metal-dopant-containing molecular precursor compound can be e.g. a metal halide or a metal alkoxide or a mixture thereof.

If the metal dopant is Sb, the Sb-containing molecular precursor compound can be a Sb(III) compound (e.g. a Sb(III) halide, a Sb(III) carboxylate, or a Sb(III) alkoxide), a Sb(V) compound (e.g. a Sb(V) halide, a Sb(V) carboxylate, or a Sb(V) alkoxide), or a mixture thereof.

In a preferred embodiment, the wet chemical synthesis is carried out in the presence of a solid additive having a BET surface area of at least 40 m$^2$/g.

The solid additive can be added to the reaction mixture before starting and/or while carrying out the wet chemical synthesis (e.g. the precipitation or sol-gel process).

A preferred solid additive is carbon, such as carbon black or activated carbon. As known to the skilled person, carbon black is manufactured by thermal decomposition or incomplete combustion of hydrocarbon compounds and is commercially available in different grades (which differ in BET surface area). Furthermore, as known to the skilled person, activated carbon is a porous carbon material which has been subjected to reaction with gases before, during or after carbonization in order to increase its adsorptive properties.

Preferably, the solid additive has a BET surface area of at least 200 m$^2$/g, more preferably at least 500 m$^2$/g or even at least 750 m$^2$/g; such as from 200 m$^2$/g to 2500 m$^2$/g, more preferably from 500 m$^2$/g to 2000 m$^2$/g, even more preferably from 750 m$^2$/g to 1800 m$^2$/g.

The solid additive can be micro- and/or mesoporous. However, it is also possible that the solid additive is non-porous as long as its BET surface area is at least 40 m$^2$/g.

Other additives that can be added to the reaction mixture before and/or during the wet chemical synthesis include e.g. surfactants, emulsifiers, dispersants, pH-modifiers, and/or amino acids (e.g. alanine).

As indicated above, the metal-doped tin oxide precursor solid obtained by the wet chemical synthesis is subjected to a thermal treatment.

The thermal treatment can be carried out at a relatively low temperature just for removing residual solvent from the wet chemical synthesis. However, in a preferred embodiment, the thermal treatment includes heating to a temperature within the range of from 400 to 800° C., more preferably 500 to 700° C.

If a solid additive such as carbon has been added to the reaction mixture, said solid additive can be burnt off or decomposed to gaseous decomposition products by a thermal treatment at relatively high temperature.

According to a further aspect, the present invention relates to a composite material, comprising the metal-doped tin oxide as described above, and an electrocatalyst which is supported on the metal-doped tin oxide.

Preferably, the electrocatalyst is an oxygen evolution reaction (OER) catalyst or an oxygen reduction reaction (ORR) catalyst.

Appropriate OER catalysts are commonly known to the skilled person and are described e.g. by M. Carmo et al., "*A comprehensive review on PEM water electrolysis*", International Journal of Hydrogen Energy, Vol. 38, 2013, pp. 4901-4934. The OER catalyst can be e.g. a noble metal (e.g. Ir, Ru, or mixtures or alloys thereof), a noble metal oxide (e.g. an iridium oxide, a ruthenium oxide, or a mixed Ir/Ru oxide), or a mixture thereof. The OER catalyst can be applied onto the metal-doped tin oxide by commonly known methods, such as adsorption from a solution containing a precursor compound (e.g. a noble metal salt), followed by a chemical treatment (e.g. reduction or oxidation), or by reductive precipitation of noble metal particles or precipitation of noble metal oxides or hydroxides.

Appropriate ORR catalysts are also commonly known to the skilled person.

The electrocatalyst can be present in an amount of e.g. 10 to 95 wt %, based on the combined weight of the metal-doped tin oxide and the electrocatalyst.

In principle, the composite material may, in addition to the metal-doped tin oxide and the electrocatalyst supported thereon, contain further components. However, as the metal-doped tin oxide of the present invention provides an improved balance between a sufficiently high specific surface area, high electrochemical performance and high stability even under very corrosive conditions, the performance level (e.g. at the anode side of a PEM water electrolyser) of the composite material is already sufficiently high even if no further component is present. So, the composite material of the present invention may consist of the metal-doped tin oxide and the electrocatalyst supported thereon.

According to a further aspect, the present invention relates to an electrochemical device, containing the composite material described above.

Preferably, the electrochemical device is a PEM ("proton exchange membrane") water electrolyzer or a PEM fuel cell.

Like in any water electrolyser, at least one anode-containing half cell where the oxygen evolution reaction takes place, and at least one cathode-containing half cell where the hydrogen evolution reaction takes place, are present in the PEM water electrolyser of the present invention. The metal-doped tin oxide, on which the OER catalyst is supported, is present in the anode-containing half-cell.

If the electrochemical device is a PEM fuel cell, the metal-doped tin oxide, on which the ORR catalyst is supported, is present in the cathode-containing half-cell.

According to a further aspect, the present invention relates to the use of the metal-doped tin oxide as a catalyst support in an electrochemical device, preferably a PEM water electrolyser or a PEM (e.g. hydrogen-oxygen) fuel cell.

The present invention will now be described in further detail by the following examples.

EXAMPLES

If not indicated otherwise, the parameters referred to in the present invention are determined according to the following measuring methods:

Amount of Metal Dopant

The amounts of metal dopant and tin are determined by elemental analysis performed on the synthesized samples, according to the following method: 0.04 to 0.5 g of each sample is mixed with 10 g of a mixture of 84% Li$_2$B$_4$O$_7$, 1% LiBr und 15% NaNO$_3$. Using a Claisse Fluxer M4, a mixed pellet is formed. After cooling to room temperature, the elemental composition is determined using wavelength dispersive X-ray fluorescence.

BET Surface Area

BET surface area was determined by gas adsorption analysis using Micromeritics ASAP 2420 Surface Area and Porosity Analyzer with N$_2$ adsorbate at 77.35 K. Prior to the measurement, samples were dried at 200° C. in vacuum overnight. The specific surface area was determined by BET theory using the multi-point method (ISO 9277:2010).

Electrical Conductivity

For measuring electrical conductivity, the oxide powders were pressed into pellets and the conductivity was determined at room temperature by a 2 point probe method. First, ca. 1 g of the powder samples were inserted into the Teflon tube with stainless steel bottom (electrode) of an in-house measuring cell. After the filling is completed, a second stainless steel electrode was inserted on the top, and the filled test cell is inserted in between the pressure gauge. The pressure is increased from 100 to 500 bar. At each pressure the resistance is measured via the 2 point method with an Agilent 3458A multimeter. From the measured resistance R (in Ohm), the specific powder conductivity is calculated according to:

Conductivity=$d/(R \cdot A)$ d: distance of the 2 electrodes
R: measured resistance
A: electrode area (0.5 cm$^2$)

The total resistance is the sum of the following contributions: electrode contact resistance, intragrain (bulk) resistance and intergrain resistance. The resistance values are all reported at 500 bar.

Atomic ratio of atoms of oxidation state OS2 to atoms of oxidation state OS1 The ratio was determined by X-ray photoelectron spectroscopy (XPS). The XPS analyses were carried out with a Phi Versa Probe 5000 spectrometer using monochromatic Al Kα radiation (49 W) and Phi charge neutralizer system. The instrument work function was calibrated to give a binding energy (BE) of 84.00 eV for the Au 4f7/2 line of metallic gold and the spectrometer dispersion was adjusted to give a BE of 932.62 eV for the Cu 2p3/2 line of metallic copper. An analysis spot of 100×1400 µm$^2$ area was analyzed with a pass energy of 23.5 eV.

If the metal dopant is e.g. Sb, Sb 3d and O1s spectra overlap and were analyzed using CasaXPS software version 2.3.17 using Shirley background subtraction in the energy region of 528-542.5 eV binding energy. Antimony contributions were fitted with three different components: Sb(III)-doublet at 529.7 and 539.1 eV, Sb(V)-doublet at 530.9 and 540.3 eV, Plasmons at 531.9 and 541.5 eV. Additionally, three oxygen contributions were used for fitting. Relative sensitivity factors as provided by the instrument manufacturer were used for quantification.

Inventive Example 1

In Inventive Example 1, an antimony-doped tin oxide was prepared as follows:

All steps of the wet chemical synthesis were carried out in nitrogen atmosphere and under stirring.

0.41 g SbCl$_3$, 250 ml ethanol, and 1.25 g HCl (32 wt %) were mixed. Subsequently, 6.14 g SnCl$_4$ was added over 30 minutes via a dropping funnel. After 10 minutes of further stirring, 10 g carbon black (microporous, BET surface area of about 1400 m2/g) was added. Stirring was continued for 10 minutes, followed by homogenization in an ultrasonic bath for 30 minutes. Then, a mixture of 15.7 ml aqueous ammonia solution (25 wt %) and 1.32 g alanine was dropwise added via a dropping funnel over 30 minutes. Stirring was continued for 16 hours.

The solid material obtained by the wet chemical synthesis was filtered in air atmosphere and washed with water. The solid was dried at 100 mbar/80° C. The solid was subjected to a thermal treatment at 700° C. (heating rate: 1° C./min) for 1 hour in a furnace in air atmosphere.

Inventive Example 2

The antimony-doped tin oxide was prepared as described in Inventive Example 1 with the following modifications:
The amount of SbCl$_3$ was 0.82 g and the amount of SnCl$_4$ was 6.14 g.

Inventive Example 3

The antimony-doped tin oxide was prepared as described in Inventive Example 1 with the following modifications:
The amount of SbCl$_3$ was 1.23 g and the amount of SnCl$_4$ was 6.14 g.

Comparative Example 1

A commercially available antimony-doped tin oxide having a Sb content of 8.0 wt %, a BET surface area of 41 m$^2$/g, and an electrical conductivity of 0.0206 S/cm was used.

Comparative Example 2

A commercially available antimony-doped tin oxide having a Sb content of 11.9 wt %, a BET surface area of 70 m$^2$/g, and an electrical conductivity of 0.00342 S/cm was used.

Comparative Example 3

A commercially available non-doped SnO$_2$ having a BET surface area of 71 m$^2$/g, and an electrical conductivity of 3.0E-05 S/cm was used.

The properties are summarized in Table 1.

TABLE 1

Properties of the samples of Inventive Examples 1-3 and Comparative Examples 1-3

| | BET (m2/g) | Conductivity (S/cm) | Sb content (wt %) | Sb/(Sb + Sn) molar ratio | Sb$^{5+}$/Sb$^{3+}$ atomic ratio |
|---|---|---|---|---|---|
| Inventive Example 1 | 95 | 0.0437 | 5.0 | 0.068 | 6.0 |
| Inventive Example 2 | 45 | 0.258 | 11.0 | 0.143 | 8.4 |
| Inventive Example 3 | 100 | 0.0227 | 15.0 | 0.2 | 8.9 |
| Comparative Example 1 | 41 | 0.0206 | 8.0 | 0.105 | 14.3 |
| Comparative Example 2 | 70 | 0.00342 | 11.9 | 0.155 | 14.1 |
| Comparative Example 3 | 71 | 3.0E-05 | 0 | 0 | 0 |

Electrochemical Performance and Stability Test

From each of the powder samples of Inventive Examples 1-3 and Comparative Examples 1-3, an ink was prepared by mixing 10 mg of the powder with 2.35 ml H$_2$O, 0.586 ml isopropanol, and 3.81 µl 5 wt % Nafion, followed by sonicating the mixture for about 30 minutes. The inks were then drop-cast on titanium foil electrodes with a loading of 120 µg/cm$^2$.

For electrochemical characterization, all samples were then submitted to an accelerated aging test protocol wherein a high anodic potential (2 V vs. RHE) is applied, and the capacitance of the sample was measured via cyclic voltametry. The electrolyte was chosen to mimic the conditions of a PEM electrolyser.

The final capacitance value of each sample at the end of the accelerated aging test is listed in the following Table 2:

TABLE 2

Final capacitance values of the accelerated aging test

| | Final capacitance (F/g) |
|---|---|
| Inventive Example 1 | 6.2 |
| Inventive Example 2 | 4.1 |
| Inventive Example 3 | 3.5 |

TABLE 2-continued

Final capacitance values of the accelerated aging test

|  | Final capacitance (F/g) |
|---|---|
| Comparative Example 1 | 1.9 |
| Comparative Example 2 | 0.8 |
| Comparative Example 3 | 0.6 |

The antimony-doped tin oxides of the present invention show much higher capacitance values than the comparative samples. A high capacitance value means that there is a large electrochemically accessible surface area enabling an improved electron transfer from the oxide to a catalyst supported thereon.

FIG. 1 shows the capacitance (measured in the accelerated aging test) as a function of time for the samples of Inventive Example 1 and Comparative Examples 1-3.

With the inventive metal-doped tin oxide, electrochemical performance can be kept on a high level throughout the entire aging test. Comparative Example 2 shows a fairly high initial capacitance which is however significantly reduced during the aging test, thereby indicating an insufficient stability under the very corrosive conditions of the aging test. The electrochemical performance levels of Comparative Examples 1 and 3 are significantly lower than the one achieved by the inventive sample.

For Inventive Example 1 and Comparative Example 2, it was determined how much of the metal dopant is leached from the oxide into the surrounding electrolyte during the accelerated aging test.

The results are shown in Table 3.

TABLE 3

Amount of Sb detected in the electrolyte at the end of the aging test

|  | Amount of Sb in the electrolyte [ppm] |
|---|---|
| Inventive Example 1 | <0.1 |
| Comparative Example 2 | 0.2 |

As confirmed by the results of Table 3, the metal-doped tin oxides of the present invention show high stability even under very corrosive conditions as used e.g. in PEM water electrolysers.

As demonstrated by the Examples, the metal-doped tin oxides according to the present invention provide an improved balance between electrochemical performance (e.g. high capacitance values), sufficiently high surface area, sufficiently high conductivity, and high stability under very corrosive conditions (as they are typically used at the anode side of a PEM water electrolyser).

The invention claimed is:

1. A metal-doped tin oxide which
   has a BET surface area of at least 30 $m^2/g$, and
   comprises a dopant which is Sb,
   wherein the metal dopant
   is present in an amount of from 2.5 at % to 25 at %, based on the total amount of tin and metal dopant atoms, and
   is in a mixed valence state containing $Sb^{3+}$ atoms and $Sb^{5+}$ atoms, wherein the atomic ratio of $Sb^{5+}$ to $Sb^{3+}$, measured by X-ray photoelectron spectroscopy, is from 5.0 to 9.0.

2. The metal-doped tin oxide according to claim 1, wherein the amount of the metal dopant is from 2.5 at % to 10.0 at %.

3. The metal-doped tin oxide according to claim 1, wherein the BET surface area of the metal-doped tin oxide is from 30 $m^2/g$ to 150 $m^2/g$ and/or the electrical conductivity of the metal doped tin oxide is at least 0.02 S/cm.

4. The metal-doped tin oxide according to claim 1, wherein the amount of the metal dopant is from 5.0 at % to 7.5 at %.

5. The metal-doped tin oxide according to claim 1, wherein the BET surface area of the metal-doped tin oxide is from 35 $m^2/g$ to 110 $m^2/g$; and/or the electrical conductivity of the metal doped tin oxide is at least 0.03 S/cm.

6. The metal-doped tin oxide according to claim 1, wherein the atomic ratio of the $Sb^{5+}$ atoms to the $Sb^{3+}$ atoms is from 5.0 to 8.0.

7. A process for preparing the metal-doped tin oxide according to claim 1, comprising
   preparing a metal-doped precursor solid by a wet chemical synthesis from a reaction mixture comprising a tin-containing molecular precursor compound and a metal-dopant-containing molecular precursor compound,
   subjecting the metal-doped precursor solid to a thermal treatment.

8. The process according to claim 7, wherein the wet chemical synthesis is a sol-gel process, a chemical precipitation process, a hydrothermal synthesis process, a spray drying process, or any combination thereof.

9. The process according to claim 7, wherein the tin-containing molecular precursor compound and the metal-dopant-containing molecular precursor compound are mixed at acidic pH, and the pH is subsequently raised by adding a base until the metal-doped precursor solid precipitates; and/or wherein the wet chemical synthesis is carried out in an alcoholic solvent.

10. The process according to claim 7, wherein the tin-containing molecular precursor compound is a tin salt such as a tin halide or a tin nitrate, or a tin alkoxide, or a mixture thereof; and/or the metal-dopant-containing molecular precursor compound is a metal halide, a metal carboxylate or a metal alkoxide or any mixture thereof.

11. The process according to claim 7, wherein the wet chemical synthesis is carried out in the presence of a solid additive having a BET surface area of at least 40 $m^2/g$.

12. The process according to claim 11, wherein the solid additive is carbon black or activated carbon, which has a BET surface area of at least 200 $m^2/g$.

13. The process according to claim 7, wherein the thermal treatment includes heating to a temperature of from 400 to 800° C.

14. The process according to claim 11, wherein the solid additive is carbon black or activated carbon, which has a BET surface area of at least 500 $m^2/g$.

15. A composite material, comprising the metal-doped tin oxide according to claim 1, and an electrocatalyst which is supported on the metal-doped tin oxide.

16. An electrochemical device, comprising the composite material according to claim 15.

17. The electrochemical device according to claim 16, wherein the electrochemical device is a polymer electrolyte membrane PEM water electrolyzer or a PEM fuel cell.

18. A catalyst support in an electrochemical device, comprising the metal-doped tin oxide according claim 1, wherein the electrochemical device is a polymer electrolyte membrane PEM water electrolyzer or a PEM fuel cell.

* * * * *